United States Patent [19]

Simoudis

[11] Patent Number: 5,101,362

[45] Date of Patent: Mar. 31, 1992

[54] MODULAR BLACKBOARD BASED EXPERT SYSTEM

[75] Inventor: Evangelos Simoudis, Marlboro, Mass.

[73] Assignee: Digital Equipment Corporation, Maynard, Mass.

[21] Appl. No.: 609,032

[22] Filed: Nov. 5, 1990

Related U.S. Application Data

[63] Continuation of Ser. No. 284,198, Dec. 14, 1988, abandoned.

[51] Int. Cl.$^5$ .............................................. G06F 15/18
[52] U.S. Cl. ....................................................... 395/53
[58] Field of Search ................................. 364/513, 200

[56] References Cited

U.S. PATENT DOCUMENTS 4,868,763  9/1989  Masui et al. ........................... 364/513

OTHER PUBLICATIONS

Part One, Blackboard Systems: The Blackboard Model of Problem Solving and the Evolution of Blackboard Architectures, H. Penny Nii, The AI Magazine, Summer 1986, pp. 38-53.

Part Two, Blackboard Systems: Blackboard Application Systems, Blackboard Systems from a Knowledge Engineering Perspective, H. Penny Nii, The AI Magazine, Aug. 1986, pp. 82-106.

Primary Examiner—Allen R. MacDonald
Attorney, Agent, or Firm—Kenyon & Kenyon

[57] ABSTRACT

An expert system includes a blackboard, a plurality of knowledge sources, a control knowledge source and a control module. The blackboard stores data used during an execution cycle. Each knowledge source includes rules for performing selected operations in connection with the data in the blackboard. The control knowledge source includes selection rules for selecting among the knowledge sources. The control module performing an execution cycle including an eligibility determination phase to identify one or more of the knowledge sources, a knowledge source selection phase using the selection rules in said control knowledge source to select one of the identified knowledge sources, and an action phase to process a rule of the selected knowledge source.

56 Claims, 4 Drawing Sheets

MODULAR BLACKBOARD BASED EXPERT SYSTEM

This application is a continuation of application Ser. No. 284,198, filed Dec. 14, 1988, now abandoned.

FIELD OF THE INVENTION

The invention relates generally to the field of rule-based expert systems.

BACKGROUND OF THE INVENTION

Typical expert systems include a knowledge base, a working memory and a control portion, or inference engine. The knowledge base contains knowledge represented in the form of either production rules or procedures or a combination of both. The working memory, which is also termed a "blackboard", contains a set of facts, which may be established at the beginning of operation of the system, during prior processing by the system, or by an operator. The control portion controls the operation of the system in a series of execution cycles during which it processes the rules or procedures in connection with the contents of the working memory.

Production rules generally comprise two portions, namely, a condition portion, generally identified as the "left-hand side" of the rule, and an action or consequent list, which is generally identified as the "right-hand side" of the rule. The condition portion identifies one or more conditions which may be satisfied by the facts in the blackboard. The action list specifies one or more actions in connection with the system, such as adding, deleting or modifying a fact on the blackboard, transmitting a message to the operator, or halting the execution cycle. If the conditions comprising a rule's condition portion are satisfied, the rule is said to "fire", in which case the control portion executes the operations specified in the action list.

Procedures are essentially computer programs that define a series of steps or operations to be performed during an execution cycle. The procedure may specify, for example, one or more actions to be taken in connection with the system such as storing facts in the blackboard, transmitting a message to the operator or halting the execution cycle.

SUMMARY OF THE INVENTION

The invention provides a new and improved expert system.

In brief summary, the expert system includes a blackboard, a plurality of knowledge sources, a control knowledge source and a control module. The blackboard stores facts used during an execution cycle. Each knowledge source includes rules for performing selected operations in connection with the facts in the blackboard. The control knowledge source includes selection rules for selecting among the knowledge sources. The control module performing an execution cycle including an eligibility determination phase to identify one or more of the knowledge sources, a knowledge source selection phase using the selection rules in said control knowledge source to select one of the identified knowledge sources, and an action phase to process a rule of the selected knowledge source.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
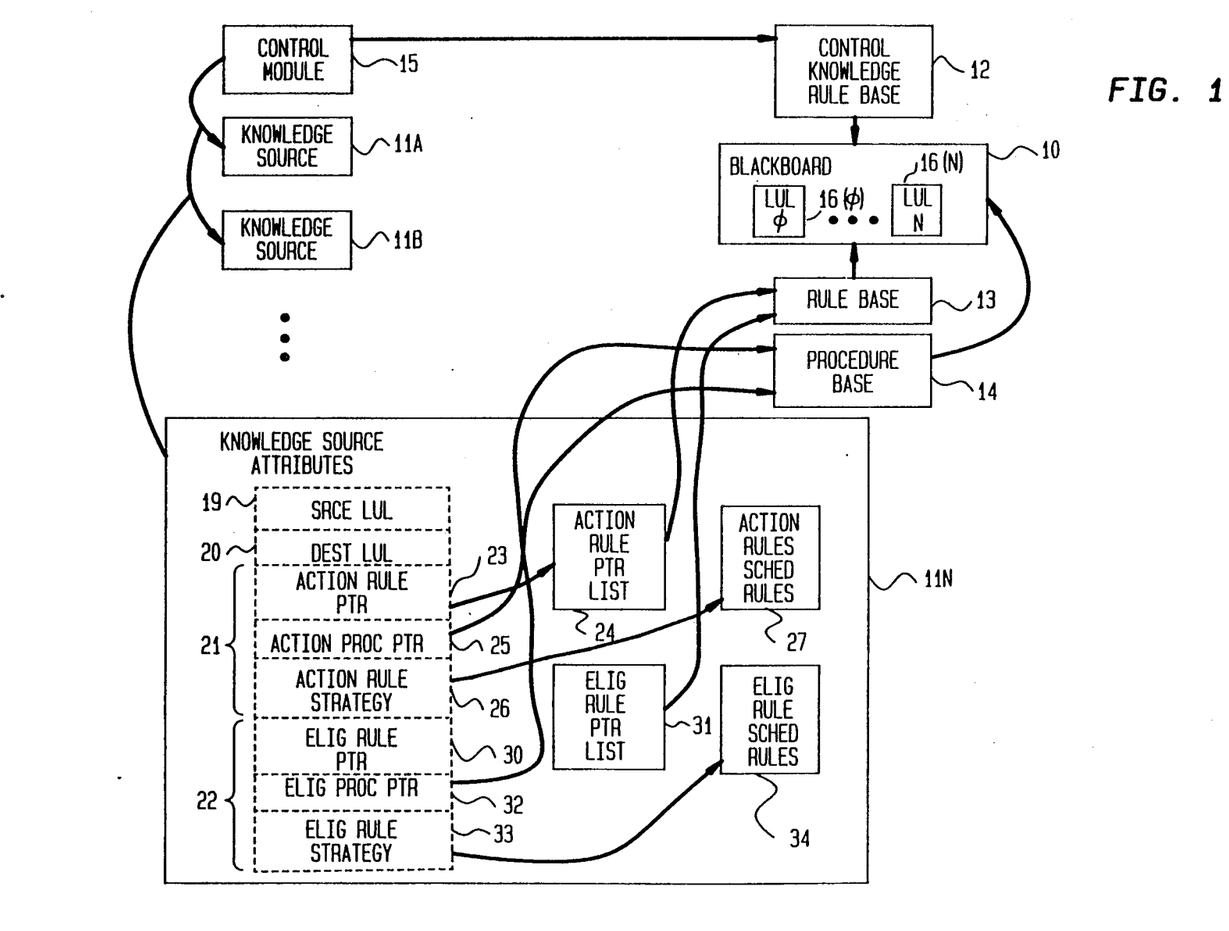
FIG. 1 is a functional block diagram of an expert system constructed in accordance with the invention.

FIG. 1 depicts a functional block diagram of an expert system constructed in accordance with the invention. With reference to FIG. 1, the system includes a blackboard 10, a plurality of knowledge sources 11A through 11N (generally identified by reference numeral 11), a control knowledge rule base 12, a rule base 13, and a procedure base 14 all controlled by a control module 15. As is conventional, the system depicted in FIG. 1 represents functional elements or computer programs processed by a computer including a processor element, memory element and input/output element under control of an operator.

The blackboard 10 comprises a region of the computer memory which is shared by the other functional elements of the system as described below. The blackboard 10 is divided into a plurality of sub-regions, identified as levels, 16(0) through 16(N) (generally identified by reference numeral 16).

The rule base 13 contains one or more production rules. A production rule typically comprises two parts, including a condition portion and an action, or consequent, portion. Briefly, the condition portion, which is also known as the "left-hand side", sets forth one or more conditions. Each condition relates to one or more of the facts which may be present in the blackboard 10, so that, if the facts in the blackboard 10 indicate that the conditions are satisfied, the rule is said to "fire". If a rule fires, the actions specified in the action portion are performed, as a result of which facts on the blackboard 10 may be modified, may be added to or deleted from the blackboard 10. Additionally, actions identified in the action portion of a rule may specify that a message be delivered to the operator through the computer's input/output element. Furthermore, the actions may specify that selected control actions, such as initialization or termination of operation, be taken concerning the operation of the system.

The procedure base 14 contains one or more procedures each defining a sequence of operations to be taken. The operations may specify operations to be taken in connection with the facts in the blackboard 10, such as adding, deleting or modifying selected facts, may specify that messages be delivered to the operator through the computer's input/output element, and may also specify selected control actions, such as initialization or termination of operation, to be taken in connection with the operation of the system.

The knowledge sources 11 include information that controls selection of particular rules in the rule base 13 and/or procedures in the procedure base 14. Preliminarily, in connection with a particular application in which the system depicted in FIG. 1 may be used, each knowledge source 11 is associated with, and used in connection with, some portions or aspects of the application. In connection with the portions of the application with which the knowledge source 11 is associated, the knowledge source 11 identifies rules in the rule base 13 and/or procedures in the procedure base 14 that relate to the portions of the application with respect to which the knowledge source 11 is associated. The rules and procedures that relate to portions of the application are termed herein "action rules" and "action procedures", respectively.

In addition, the knowledge source 11 identifies rules in the rule base 13 and/or procedures in the procedure base 14 that, in turn, identify the knowledge source 11 as being associated with the particular portions of the application. These rules and procedures are termed herein "eligibility rules" and "eligibility procedures", respectively.

Finally, the control knowledge rule base 12 contains rules that resolve conflicts among knowledge sources 11 when more than one knowledge source 11 may be associated with particular portions of an application. That is, if more than one knowledge source 11 is associated with a portion of an application, the control knowledge rule base 12 selects one of the knowledge sources 11 to be applied.

For example, in one embodiment, the system depicted in FIG. 1 may be used to perform redesign operations in connection with an electrical circuit design based on differences between simulated operational characteristics of the circuit and desired operational characteristics of the circuit as provided by the operator. In that embodiment, the facts in the blackboard 10 comprise the identifications of the components of the electrical circuit and their interconnections, as well as the simulated operational characteristics and the desired operational characteristics. The action rules and action procedures of the various knowledge sources 11 may, for example, enable identifications of components to be deleted from or added to the blackboard 10, and may also enable interconnections among components to be changed, to correct particular discrepancies between the simulated operational characteristics and the desired operational characteristics.

On the other hand, the eligibility rules and procedures of each of the knowledge sources 11 enable each respective knowledge source 11 to be identified as useful in connection with a redesign operation to correct a discrepancy between the simulated and desired operational characteristics. A plurality of knowledge sources 11 may be useful in correcting a discrepancy, as indicated by their respective eligibility rules and procedures, and the rules in the control knowledge rule base 12 enables the selection of one particular knowledge source 11. After the control module 15 selects a knowledge source 11, it uses the action rules and/or procedures to actually perform a redesign operation.

The control module 15 controls the other portions of the system depicted in FIG. 1 in an extension cycle, each comprising three phases. During a first phase, control module 15 identifies the knowledge sources 11 that are associated with the particular portions of the application. In this operation, the control module 15 uses the rules in the rule base 13 and/or procedures in the procedure base 14 that are identified as eligibility rules and eligibility procedures, respectively, by all of the knowledge sources 11. With reference to the preceding example, during the first phase, the control module 15 identifies the knowledge sources 11 that are eligible to be used in performing a redesign operation in connection with the discrepancies between the simulated and desired operational characteristics of the electrical circuit.

After the first phase, the control module 15 enters a second phase, in which it selects one of the knowledge sources 11 using the knowledge source selection rules in the control knowledge rule base 12. After the control module 15 selects a knowledge source 11, it enters a third phase, in which it uses the action rules and/or action procedures identified by the knowledge source 11. With reference to the preceding example, during the third phase the control module 15 performs a redesign operation enabled by action rules in the rule base 13 and/or action procedures in the procedure base 14 identified by the knowledge source 11 to end the execution cycle. After the execution cycle, other elements of an application system including the expert system depicted in FIG. 1 may add, delete, or modify facts in the blackboard 10, and enable the control module to perform another execution cycle.

As described above, a knowledge source 11 identifies rules in the rule base 13 and/or procedures in the procedure base 14. The elements in the knowledge sources 11 are similar and so only one knowledge source 11N is depicted in detail. The knowledge source 11 includes a set of attributes, including a source level attribute 19 and a destination level attribute 20 both of which associate the knowledge source 11 with a level 16 in the blackboard 10. The source level attribute identifies the level 16 in the blackboard 10 from which the control module 15 obtains the facts used in processing the rules and procedures associated with the knowledge source 11. In addition, as noted above, the action rules and action procedures may enable facts in the blackboard 10 to be added, modified or deleted, and the destination level attribute 20 identifies the level 16 in the blackboard 10 in which these operations are to occur.

The knowledge source 11 also includes two sets of attributes directed to the association of the rules in the rule base 13 and procedures in the procedure base 14 with the knowledge source 11, including an action attribute set 21 and an eligibility attribute set 22. The action attribute set 21 includes an action rule pointer 23, an action procedure pointer 25 and an action rule strategy pointer 26. The action rule pointer 23 points to an action rule pointer list 24. The action rule pointer list, in turn, contains pointers that point to the action rules in the rule base 13 that are associated with the knowledge source 11. The action procedure pointer 25 points to an action procedure in the procedure base 14. In one specific embodiment, the action procedure pointer 25 is empty (that is, it does not contain a pointer to an action procedure) unless the action rule pointer 23 is empty or the action rule pointer list 24 pointed to by the action rule pointer 23 is empty.

Finally, the action rule strategy pointer 26 points to a set of action rules scheduling rules 27 which define the order in which the action rules identified by the action rule pointer list 24 are to be used by the control module 15 during the third phase of the execution cycle. The action rules scheduling rules 27 effectively resolve conflicts among the action rules. Depending on the application, the action rules scheduling rules 27 may enable only one or some of the action rules identified by the action rule pointer list 24 to be used, or they may enable all of them to be used in a particular order.

Similarly, the eligibility attribute set 22 includes an eligibility rule pointer 30, an eligibility procedure pointer 32 and an eligibility rule strategy pointer 33. The eligibility rule pointer 30 points to an eligibility rule pointer list 31. The eligibility rule pointer list, in turn, contains pointers that point to the eligibility rules in the rule base 13 that are associated with the knowledge source 11. The eligibility procedure pointer 32 points to an eligibility procedure in the procedure base 14. In one specific embodiment, the eligibility procedure pointer 32 is empty (that is, it does not contain a pointer to an eligibility procedure) unless the eligibility rule pointer 30 is empty or the eligibility rule pointer list 31 pointed to by the eligibility rule pointer 30 is empty.

Finally, the eligibility rule strategy pointer 33 points to a set of eligibility rules scheduling rules 34 which define the order in which the eligibility rules identified by the eligibility rule pointer list 31 are to be used by the control module 15 during the third phase of the execution cycle. The eligibility rules scheduling rules 34 effectively resolve conflicts among the eligibility rules. Depending on the application, the eligibility rules scheduling rules 34 may enable only one or some of the eligibility rules identified by the eligibility rule pointer list 31 to be used, or they may enable all of them to be used in a particular order.

The knowledge source 11 includes an action rule pointer list 24 and an eligibility rule pointer list 31, while the actual action rules and eligibility rules are provided in a single rule base 13, so that, if an action rule or an eligibility rule in the rule base 13 is associated with multiple knowledge sources 11, the rule need not be duplicated among the various knowledge sources 11. Further, aggregating the action rules and eligibility rules in a common rule base simplifies maintenance and updating of the rules as may be required. The scheduling rules, which are shown in FIG. 1 as being included in the knowledge source 11, may also be located in the rule base 13 and pointers provided as elements 27 and 34, respectively.

With this background, the operations initiated by the control module 15 in connection with the system depicted in FIG. 1 will be described in detail in connection with FIGS. 2A through 2C. As described above, the operations initiated by the control module 15 are in the form of three operational phases. In the first phase, comprising steps 100 through 107 and 110 through 111 (FIG. 2A), the control module 15 determines the eligibility of the various knowledge sources 11 using the eligibility rules and/or eligibility procedures defined by the eligibility attribute set 22. In the second phase, comprising steps 120 through 126 (FIG. 2B), the control module 15, using the rules in the control knowledge rule base 12, selects one of the knowledge sources 11. Finally, in the third phase, comprising steps 130 through 137 and 140, the control module 15 uses the action rules and/or action procedures defined by the action attribute set 21 of the selected knowledge source 11.

Figure 2A:
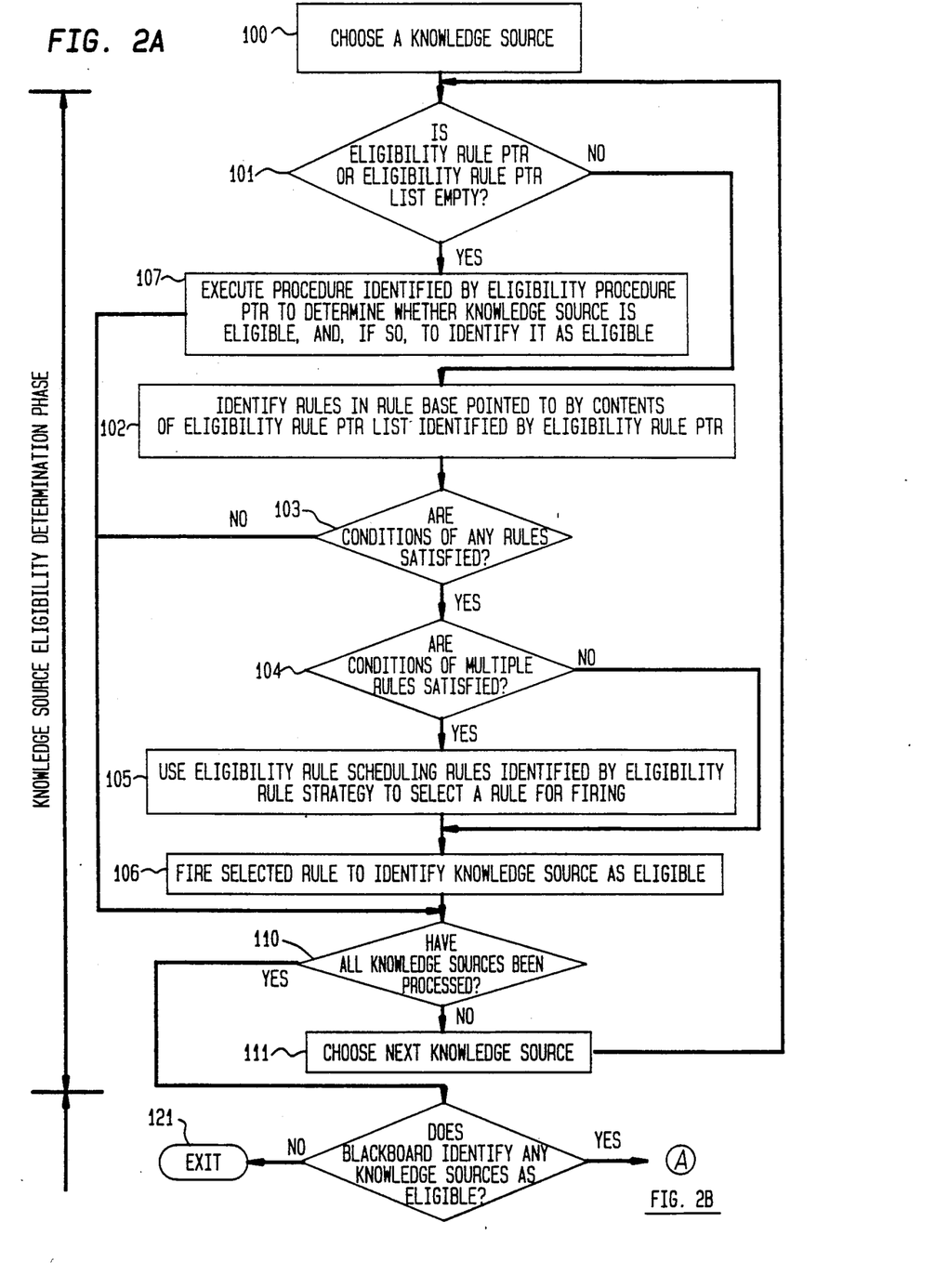
FIGS. 2A through 2C are flow diagrams useful in understanding the operation of the expert system constructed in FIG. 1.
Figure 2B:
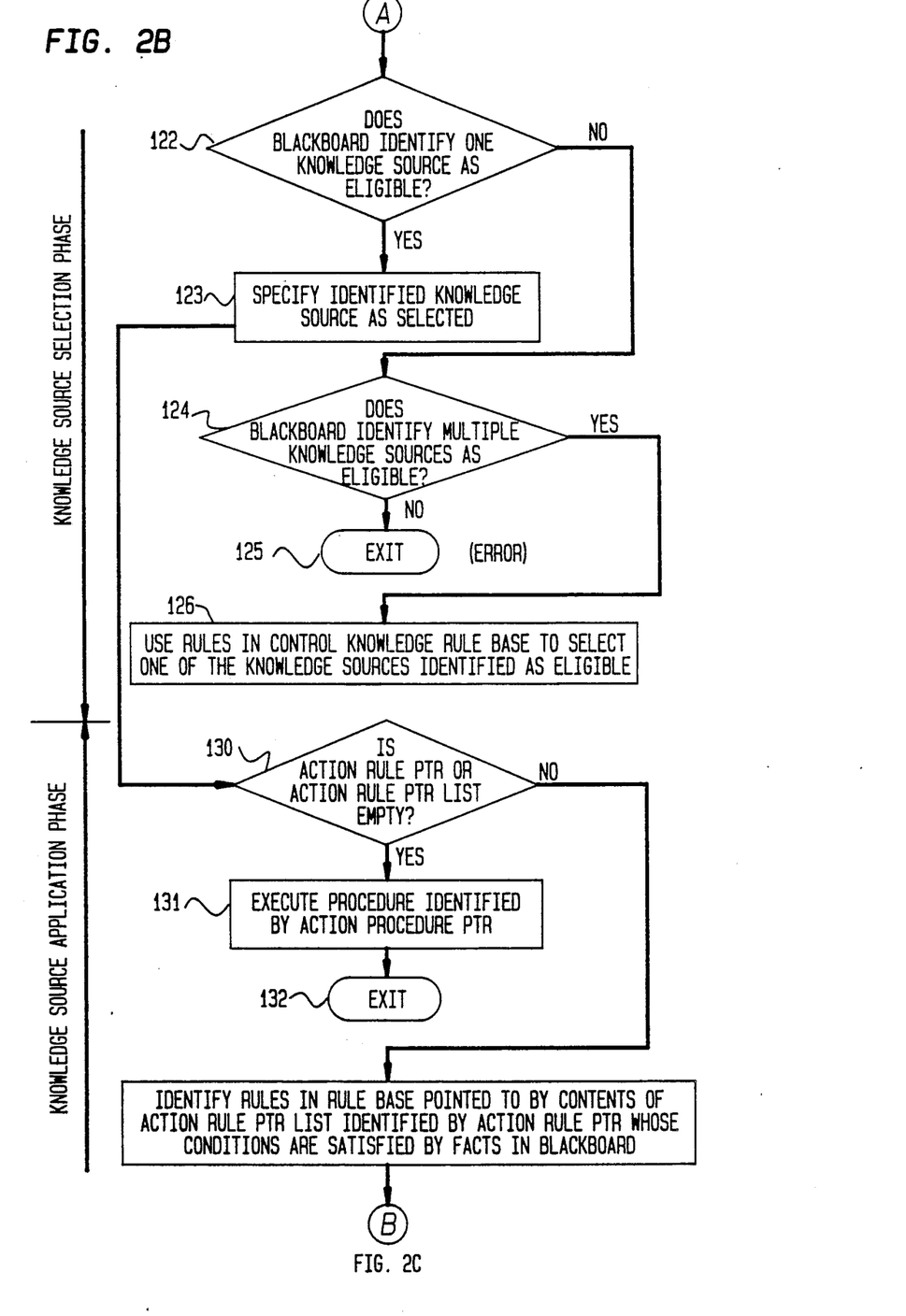

With reference to FIG. 2A, in the first phase the control module initially chooses a knowledge source 11 (step 100) and determines whether it has an associated eligibility rule or eligibility procedure to determine whether the knowledge source 11 is eligible to be selected during the second phase. If the eligibility rule pointer 30 and eligibility rule pointer list 31 are not empty, the knowledge source 11 has an eligibility rule, but if either the eligibility rule pointer 30 or the eligibility rule pointer list 31 are empty, the knowledge source 11 has an associated eligibility procedure which is to be used to determine eligibility of the knowledge source 11.

Thus, if neither the eligibility rule pointer 30 nor the eligibility rule pointer list 31 are empty (step 101), the control module sequences to step 102, in which it identifies, using the pointers in the eligibility rule pointer list 31 identified by the eligibility rule pointer 30, the eligibility rules in the rule base 13 which determine eligibility of the knowledge source 11. The control module 15 then determines whether any of the condition portions of any of the eligibility rules are satisfied by the facts on the blackboard 10 (step 103), to determine whether any of the eligibility rules pointed to by the knowledge source 11 are in condition for firing. In this operation, the control module 15 uses the facts in the level 16 of blackboard 10 that is identified by the source level attribute 19 of the knowledge source 11. If the conditions of none of the eligibility rules are satisfied, the control module sequences to step 110.

If any of the eligibility rules pointed to by the knowledge source 11 are in condition for firing, that is, if any of their condition portions are satisfied by the facts in the blackboard 10, the control module 15 then determines whether only one eligibility rule is in condition for firing or multiple eligibility rules are eligible for firing (step 104). If only one eligibility rule is in condition for firing, the control module 15 sequences to step 106. On the other hand, if multiple eligibility rules are in condition for firing, the control module uses the eligibility rules scheduling rules 34 identified by the eligibility rule strategy pointer 33 to select one or more of the identified eligibility rules for firing (step 105).

Following steps 104 or 105, that is, after the control module 15 selects one or more of the eligibility rules in the rule base 13 pointed to by the eligibility rule pointer list 31, it fires the selected rule(s) to identify the knowledge source 11 as being eligible (step 106). In that operation, for each selected rule, the control module 15 performs the actions specified in the action list in the rule, during which it loads the identification of the knowledge source 11 on the blackboard 10 in the level identified by destination level attribute 20.

Returning to step 101, if the control module 15 determines that either the eligibility rule pointer 30 or the eligibility rule pointer list 31 is empty (step 101), the knowledge source 11 specifies, in the eligibility procedure pointer 32, an eligibility procedure in procedure base 14 to determine eligibility of the knowledge source 11. Accordingly, the control module 15 processes the identified procedure, using the facts in the level 16 of blackboard 10 identified by source level attribute 19. During processing of the eligibility procedure, the control module 15 may load the identification of the knowledge source 11 on the level 16 of the blackboard 10 identified by the destination level attribute 20. After execution of the eligibility procedure, the control module 15 sequences to step 110.

Following steps 103, 106 or 107, the control module 15 sequences to step 110, in which it determines whether it has determined eligibility of all of the knowledge sources 11. If not, it chooses another knowledge source 11 and returns to step 101. On the other hand, if it has determined eligibility by all of the knowledge sources 11, it sequences to the second phase of the execution cycle, during which it selects one of the eligible knowledge sources 11.

More specifically, during the second phase the control module 15 first determines whether any of the knowledge sources 11 are identified on the blackboard 10 as being eligible (step 120). If not, the control module exits (step 121) to terminate the execution cycle. If one knowledge source 11 is identified on the blackboard 10 as being eligible (step 122), the control module 15 specifies the identified knowledge source 11 as being selected (step 123), and sequences to the third phase (step 130) Following step 122, the control module 15 determines whether the blackboard 10 identifies multiple knowledge sources 11 as eligible (step 124). If not, an error has occurred and the control module exits (step 125).

However, if the control module 15 determines, in step 124, that multiple knowledge sources 11 are identified on the blackboard 10 as being eligible, it uses the control knowledge rule base 12 to select one of the knowledge sources 11 identified on the blackboard 10 for use during the third phase (step 126). Each rule in the control knowledge rule base 12 has a condition portion that identifies one or more of the knowledge sources 11, and an action list that enables the control module 15 to identify one of the knowledge sources 11 identified in the condition portion on the blackboard 10, to thereby select the knowledge source 11.

Thus, at the end of the second phase, either following step 123 or step 126, the control module 15 has identified, on the blackboard 10, one of the knowledge sources 11 as being selected.

During the third phase, the control module 15 applies the knowledge source 11 that was selected during the second phase, and particularly the action rules and/or action procedure identified by its action attribute set 21 (FIG. 1), to the facts in the blackboard 10. In the third phase, the control module 15 first determines whether the action rule pointer 23 or action rule pointer list is empty (step 130), and, if so, it executes the action procedure in the procedure base 14 identified by the action procedure pointer 25 (step 131). In executing the action procedure, the control module 15 uses the facts in the level 16 of the blackboard 10 identified by the source level attribute 19 of the knowledge source 11, and may add, delete and/or modify facts in the level 16 of the blackboard 10 identified by the destination level attribute 20. In addition, or alternatively, during processing of the action procedure the control module 15 may transmit a message to the operator, and/or perform control operations in connection with the system. After execution of the action procedure, the control module 15 exits (step 132).

In step 130, the control module 15 determines that the action rule pointer 23 and the action rule pointer list are not both empty, it sequences to step 133. In step 133, the control module 15 identifies those action rules in the rule base 13 that are pointed to by the contents of the action rule pointer list 24 that is, in turn, pointed to by the action rule pointer 23. After identifying the action rules, the control module 15 determines which of them are in condition for firing, that is, it determines which of the rules have condition portions that are satisfied by the facts in the level 16 in the blackboard 10 identified by the source level attribute 19. In particular, the action rules may have condition portions that identify particular ones of the levels 16 in the blackboard 10, and the control module 15 determines whether such an action rule is in condition for firing based on whether the conditions correspond to the facts in the particular level 16.

Figure 2C:
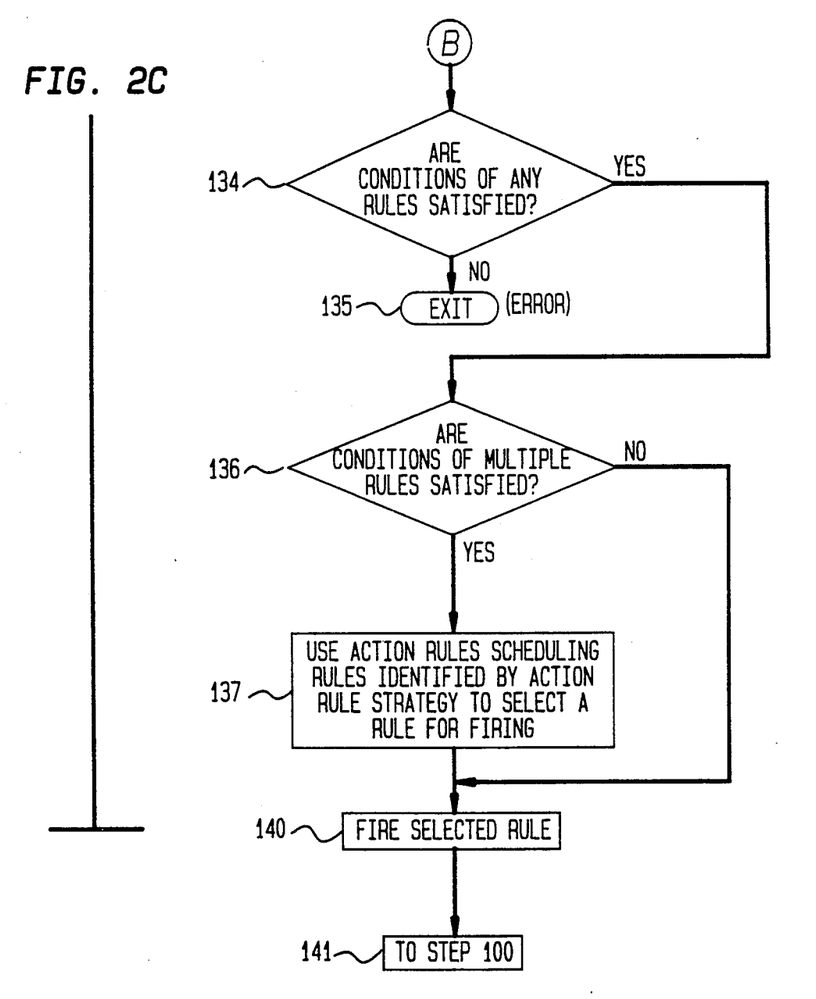

After identifying the action rules in condition for firing, the control module 15 sequences to step 134 (FIG. 2C). In step 134, the control module 15 determines whether none of the action rules were in condition for firing, in which case it sequences to step 134 to exit. If none of the action rules were in condition for firing, an error has occurred, since, for the eligibility rules to indicate that the knowledge source 11 is eligible, at least one of the action rules pointed to by the action rule pointer list of the knowledge source 11 should fire.

If, on the other hand, the control module 15 determines in step 134 that the conditions of at least one action rule are satisfied, it sequences to step 136 to determine if the conditions of multiple action rules are satisfied. If not, the conditions of only a single action rule are satisfied, and the control module 15 sequences to step 140 to fire that rule. If the control module 15 determines in step 136 that the conditions of multiple action rules are satisfied, it sequences to step 137. In step 137, the control module 15 uses the action rules scheduling rules 27 identified by the action rule strategy pointer 26 to select one or more of the action rules for firing, and the order in which the action rules are to be fired if multiple action rules are to be selected. Following step 137, the control module 15 sequences to step 140 to fire the selected action rule(s), to end the execution cycle. After step 140, the control module 15 returns to step 100 to begin another execution cycle (step 141).

The system depicted in FIG. 1 and 2A through 2C has a number of advantages. Providing the knowledge sources 11 and control knowledge rule base 12 separate and apart from the rule base 13 and the control module 15 helps to modularize the system in accordance with the application in which the system is used. Since the diverse knowledge sources 11 are associated with different portions of an application, updating and maintenance of the system are simplified, since only the knowledge sources associated with the portions of the updated system need be modified or updated. Furthermore, dividing the blackboard 10 into levels 16 helps to modularize the facts as used in connection with the rules.

The foregoing description has been a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A system comprising:
  A. a blackboard for storing data;
  B. means for defining a plurality of knowledge sources, the knowledge sources defining corresponding sets of operations to be performed in connection with said data in said blackboard;
  C. means for defining selection operations for selecting one set of operations from among said set of operations to be performed in connection with said data in said blackboard;
  D. means for performing an execution cycle, said execution cycle including an eligibility determination phase to identify one or more of the sets of operations as eligible sets of operations, a selection phase using said selection operations to select one of said identified eligible sets of operations, and an action phase to process at least one operation defined by the selected one of the sets of operations.

2. The system of claim 1 further comprising a rule base for storing a plurality of rules, each of said sets of operations including pointers to one or more rules in said rule base to define said operations.

3. The system of claim 2 wherein each of said sets of operations further defines scheduling information, said means for performing an execution cycle, processing, in said action phase, a plurality of said rules defined by said selected set of operations in an order determined by scheduling information associated with said selected one of the sets of operations.

4. The system of claim 1 further comprising a procedure base for storing a plurality of procedures, each of said sets of operations including pointers to one or more procedures in said procedure base to define said operations.

5. The system of claim 1 wherein each of said sets of operations further defines one or more eligibility determination operations, said eligibility determination operations being accessed during said eligibility determination phase.

6. The system of claim 5 further comprising a rule base for storing a plurality of rules, each of said sets of operations including pointers to one or more rules in said rule base to define said eligibility determination operations.

7. The system of claim 6 wherein each of said sets of operations further includes pointers to said rule base to define said operations.

8. The system of claim 6 wherein each of said sets of operations further defines scheduling information, said means for performing an execution cycle processing, in said eligibility determination phase, a plurality of said rules defined by the selected one of the sets of operations in an order determined by scheduling information associated with the selected one of the sets of operations.

9. The system of claim 5 further comprising a procedure base for storing a plurality of procedures, each of said sets of operations including pointers to one or more procedures in said procedure base to define said eligibility determination operations.

10. The system of claim 9 wherein each of said sets of operation further include pointers to said procedure base to define said operations.

11. The system of claim 1 further comprising a rule base for storing a plurality of rules and a procedure base for storing a plurality of procedures, each of said sets of operations including one or more pointers to one or more of said rules and procedures to define ;said operations.

12. The system of claim 11 wherein each of said sets of operations includes pointers either to said rule base or to said procedure base.

13. The system of claim 11 wherein each of said sets of operations includes pointers to at least one rule and at least one procedure.

14. The system of claim 11 further comprising a control knowledge rule base including a plurality of rules, at least one of said rules used during said selection phase.

15. The system of claim 1 wherein said blackboard is divided into a plurality of regions, each of said regions storing a portion of said data.

16. The system of claim 15 wherein said means for performing an execution cycle obtains results associated with one or more operations processed in said action phase, and stores said results in one of said regions in said blackboard.

17. The system of claim 15 wherein each of said sets of operations includes an identifier that identifies one of said regions of said blackboard, said means for performing an execution cycle processing, in said action phase, said at least one operation defined by said selected one of the sets of operations in connection with data stored in a region of said blackboard identified by an identifier associated with said selected one of the sets of operations.

18. The system of claim 17 wherein each of said sets of operations includes a second identifier that identifies a second one of the regions in said blackboard, said means for performing an execution cycle storing results of an operation processed in said action phase in a region of said blackboard identified by a second identifier associated with said selected one of the sets of operations.

19. The system of claim 1 further comprising a control knowledge of rule base including a plurality of rules, at least one of said rules used during said selection phase.

20. The system of claim 1 wherein said system is a system for redesigning electronic circuitry.

21. The system of claim 20 wherein said data represents a simulation of the operation of said electronic circuitry.

22. A system comprising:
A. a blackboard for storing data;
B. a rule base for storing a plurality of rules;
C. a procedure base for storing a plurality of procedures;
D. a plurality of sets of data operation pointers which identify one or more rules and procedures to define operations to be performed in connection with said data and one or more eligibility operation pointers which identify one or more rules and procedures to define eligibility determination operations;
E. means for defining selection operations for selecting one set of data operation pointers from among the plurality of sets of data operation pointers; and
F. means for performing an execution cycle including:
  i. an eligibility determination phase to identify one or more of the sets of operation pointers as eligible sets of data operation pointers by, for each one of the sets of data operation pointers, accessing corresponding eligibility operation pointers and processing eligibility determination operations identified by said eligibility operation pointers;
  ii. a selection phase using said selection operations to select one of said identified eligible sets of data operation pointers; and
  iii. an action phase to process one or more data operations identified by data operation pointers corresponding to said selected one of the sets of data operation pointers.

23. The system of claim 22 wherein each of said sets of data operation pointers includes pointers to at least one rule and at least one procedure.

24. A system for redesigning electronic circuitry comprising:

A. a blackboard for storing data representing a simulation of the operation of said electronic circuitry;

B. means for defining a plurality of sets of redesign operations to be performed in connection with said data in said blackboard;

C. means for defining selection operations for selecting one set of redesign operations from among said plurality of sets of redesign operations;

D. means for performing an execution cycle, said cycle including an eligibility determination phase to identify one or more of the plurality of sets of redesign operations, as eligible sets of redesign operations, a selection phase using said selection operations to select one of said identified eligible sets of operations, and an action phase to process at least one redesign operation.

25. The system of claim 24 wherein said blackboard is divided into a plurality of regions, each of said regions storing simulation data corresponding to different simulations of the operation of said electronic circuitry.

26. The system of claim 25 wherein each of said simulations corresponds to simulations of varying levels of complexity.

27. The system of claim 25 wherein each of said sets of redesign operations includes an identifier that identifies one of said regions of said blackboard, said means for performing an execution cycle, in said action phase, processing said at least one operation defined by said selected one of the sets of redesign operations in connection with data stored in a region of said blackboard identified by an identifier associated with said selected one of the sets of redesign operations.

28. The system of claim 27 wherein each of said sets of redesign operations includes a second identifier that identifies a second one of said regions in said blackboard, said means for performing an execution cycle storing results of an operation processed in said action phase in a region of said blackboard identified by a second identifier associated with said selected one of the sets of said redesign operations.

29. A method for processing operations in a system comprising a blackboard for storing data, a plurality of knowledge sources, each of which defines one or more selected operations to be performed in connection with said data in said blackboard, and a control knowledge source defining selection operations for selecting one knowledge source from among a plurality of identified knowledge sources, said method comprising the steps of:

A. identifying one or more of the knowledge sources as eligible knowledge sources;

B. selecting one of said identified eligible knowledge sources using said selection apparatus in said control knowledge source; and C. processing at least one operation defined by said selected knowledge source.

30. The system of claim 29 further comprising a rule base for storing a plurality of rules, each of said knowledge sources including pointers to one or more rules in said rule base to define said selected operations.

31. The system of claim 30 wherein each of said knowledge sources further defines scheduling information, and wherein said processing step comprises processing a plurality of said rules in an order determined by scheduling information associated with said selected knowledge source.

32. The system of claim 29 further comprising a procedure base for storing a plurality of procedures, each of said knowledge sources including pointers to one or more procedures in said procedure base to define said selected operations.

33. The system of claim 29 wherein each of said knowledge sources further defines one or more eligibility determination operations, said eligibility determination operations being used in said step of identifying.

34. The system of claim 33 further comprising a rule base for storing a plurality of rules, each of said knowledge sources including pointers to one or more rules in said rule base to define said eligibility determination operations.

35. The system of claim 34 wherein each of said knowledge sources further includes pointers to said rule base to define said selected operations.

36. The system of claim 34 wherein each of said knowledge sources further defines scheduling information, and wherein said identifying step comprises processing, for each of said knowledge sources, a plurality of said rules in an order determined by scheduling information associated with each respective knowledge source.

37. The system of claim 33 further comprising a procedure base for storing a plurality of procedures, each of said knowledge sources including pointers to one or more procedures in said procedure base to define said eligibility determination operations.

38. The system of claim 37 wherein each of said knowledge sources further includes pointers to said procedure base to define said selected operations.

39. The system of claim 29 further comprising a rule base for storing a plurality of rules and a procedure base for storing a plurality of procedures, each of said knowledge sources including one or more pointers to one or more of said rules and procedures to define said selected operations.

40. The system of claim 39 wherein each of said knowledge sources includes pointers either to said rule base or to said procedure base.

41. The system of claim 39 wherein each of said knowledge sources includes pointers to at least one rule and at least one procedure.

42. The system of claim 29 wherein said blackboard is divided into a plurality of regions, each of said regions storing a portion of said data.

43. The system of claim 42 further comprising the step of storing said results associated with said processing step in a said region in said blackboard.

44. The system of claim 42 wherein each of said knowledge sources includes an identifier that identifies a said regions of said blackboard, said processing step comprising processing said at least one operation defined by said selected knowledge source in connection with data stored in a region of said blackboard identified by an identifier associated with said selected knowledge source.

45. The system of claim 44 wherein each of said knowledge sources include a second identifier that identifies a said region in said blackboard, said method further comprising the step of storing results of an operation processed in said action phase in a region of said blackboard identified by a second identifier associated with said selected knowledge source.

46. The system of claim 29 further comprising a control knowledge rule base including a plurality of rules, at least one of said rules used in said selection step.

47. The system of claim 39 further comprising a control knowledge rule base including a plurality of rules, at least one of said rules used in said selection step.

48. The system of claim 29 wherein said system is a system for redesigning electronic circuitry.

49. The system of claim 48 wherein said data represents a simulation of the operation of said electronic circuitry.

50. A method for processing operations in a system comprising a blackboard for storing data, a rule base for storing a plurality of rules, a procedure base for storing a plurality of procedures, a plurality of knowledge sources each of which defines one or more data operation pointers which identify one or more rules and procedures to define operations to be performed in connection with said data and one or more eligibility operation pointers which identify one or more rules and procedures to define eligibility determination operations, said method comprising the steps of:
   A. identifying one or more of the knowledge sources as eligible knowledge sources by, for each knowledge source, accessing corresponding eligibility operation pointers and processing eligibility determination operations identified by said eligibility operation pointers;
   B. selecting one of said identified eligible knowledge sources using said selection operations in said control knowledge source; and
   C. processing one or more data operations identified by data operation pointers corresponding to said selected knowledge source.

51. The method of claim 50 wherein each of said knowledge sources includes pointers to at least one rule and at least one procedure.

52. A method for processing operations in a system for redesigning electronic circuitry, said system comprising a blackboard for storing data representing a simulation of the operation of said electronic circuitry, a plurality of knowledge sources, each of which defines one or more selected redesign operations to be performed in connection with said data in said blackboard, and a control knowledge source defining selection operations for selecting one knowledge source from among a plurality of identified knowledge sources, said method comprising the steps of:
   A. identifying one or more of the knowledge sources as eligible knowledge sources;
   B. selecting one of said identified eligible knowledge sources using said selection apparats in said control knowledge source; and
   C. processing at least one redesign operation defined by said selected knowledge source.

53. The system of claim 52 wherein said blackboard is divided into a plurality of regions, each of said regions storing simulation data corresponding to different simulations of the operation of said electronic circuitry.

54. The system of claim 53 wherein each of said simulations correspond to simulations of varying levels of complexity.

55. The system of claim 53 wherein each of said knowledge sources includes an identifier that identifies a said regions of said blackboard, said processing step comprising processing said at least one operation defined by said selected knowledge source in connection with data stored in a region of said blackboard identified by an identifier associated with said selected knowledge source.

56. The system of claim 55 wherein each of said knowledge sources includes a second identifier that identifies a said region in said blackboard, said method further comprising the step of storing results of an operation processed in said action phase in a region of said blackboard identified by a second identifier associated with said selected knowledge source.

* * * * *